United States Patent
Taomoto et al.

(10) Patent No.: US 7,462,373 B2
(45) Date of Patent: Dec. 9, 2008

(54) METHOD FOR PRODUCING MANGANESE OXIDE NANOPARTICLE DISPERSED MATERIAL AND ELECTRODE

(75) Inventors: Akira Taomoto, Kyoto (JP); Mitsuru Hashimoto, Nara (JP); Yuka Yamada, Nara (JP); Nobuyasu Suzuki, Nara (JP); Yuji Zenitani, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/898,703

(22) Filed: Sep. 14, 2007

(65) Prior Publication Data

US 2008/0008827 A1    Jan. 10, 2008

Related U.S. Application Data

(63) Continuation of application No. PCT/JP2006/324972, filed on Dec. 14, 2006.

(30) Foreign Application Priority Data

Dec. 21, 2005    (JP)    ............... 2005-367694

(51) Int. Cl.
*B05D 5/12* (2006.01)
*B05D 1/12* (2006.01)
*B05D 3/02* (2006.01)

(52) U.S. Cl. ............ 427/180; 427/58; 427/126.3; 427/383.1

(58) Field of Classification Search ........... 427/58, 427/126.3, 383.1, 180
See application file for complete search history.

(56) References Cited

U.S. PATENT DOCUMENTS

| | | | | |
|---|---|---|---|---|
| 3,553,087 A | * | 1/1971 | Akio | ........................ 205/200 |
| 5,120,423 A | * | 6/1992 | Kurita et al. | ............... 205/200 |
| 7,008,608 B2 | * | 3/2006 | Park et al. | ............... 423/594.6 |
| 7,079,377 B2 | * | 7/2006 | Schott et al. | ............... 361/503 |

FOREIGN PATENT DOCUMENTS

| | | |
|---|---|---|
| JP | 61-259459 | 11/1986 |
| JP | 1990-109217 | 4/1990 |
| JP | 8-184701 | 7/1996 |
| JP | 2002-093425 | 3/2002 |
| JP | 2003-053167 | 2/2003 |

(Continued)

OTHER PUBLICATIONS

International Search Report issued in corresponding International Patent Application No. PCT/JP2006/324972, mailed on Mar. 20, 2007.

(Continued)

*Primary Examiner*—Brian K Talbot
(74) *Attorney, Agent, or Firm*—McDermott Will & Emery LLP

(57) ABSTRACT

The present invention provides a method for producing a manganese oxide nanoparticle dispersed material having steps of dissolving manganese nitrate in a polyamide acid solution (Step 1); forming a coating on the surface of the substrate using the polyamide acid solution containing manganese nitrate dissolved therein (Step 2); and carbonizing the polyamide acid and depositing manganese oxide nanoparticles by subjecting the coating to a heat treatment at a temperature not less than 600° C. but not more than 1200° C. (Step 3).

5 Claims, 5 Drawing Sheets

FOREIGN PATENT DOCUMENTS

| | | |
|---|---|---|
| JP | 2003-128409 | 5/2003 |
| JP | 2005-019332 | 1/2005 |
| JP | 2005-218975 A | 5/2005 |
| WO | WO 2004/112174 A1 | 12/2004 |
| WO | WO 2005/066993 A1 | 7/2005 |

OTHER PUBLICATIONS

Akira Taomoto et al., "Flexible Structure of Graphite Sheet Prepared by Heat Treatment of Polyimide Film," Matsushita Electric Industrial Co., Ltd., Advanced Technology Research Laboratories, Mar. 28, 2004, p. 647.

* cited by examiner

METHOD FOR PRODUCING MANGANESE OXIDE NANOPARTICLE DISPERSED MATERIAL AND ELECTRODE

RELATED APPLICATIONS

This application is a continuation of international Application No. PCT/JP2006/324972, filed on Dec. 14, 2006, which in turn claims the benefit of Japanese Application No. 2005-367694, filed on Dec. 21, 2005, the disclosures of which Applications are incorporated by reference herein.

TECHNICAL FIELD

The present invention relates to a method for producing a material containing manganese oxide nanoparticles dispersed therein. Specifically, the present invention relates to a method for producing a manganese oxide nanoparticle dispersed material that is usable as an electrode for use in a battery or sensor that utilizes an oxidation-reduction reaction.

BACKGROUND ART

Heretofore, research has been conducted on various materials, such as platinum metals and like precious metals supported on activated carbon or carbon black; mixtures of activated carbon and a metal oxide; mixtures of a phthalocyanine metal and carbon powder; and heat-treated products thereof, seeking that are materials usable as a catalyst for the electrode of a fuel cell or an air cell.

Among the above catalytic materials, the platinum supported on activated carbon or carbon black can be obtained by, for example, adding and suspending baked carbon black into hexachloroplatinum acid or a like aqueous solution, subjecting the resulting suspension to evaporation drying and washing with water, and then depositing platinum particles on the surface of the carbon black.

Patent Document 1 discloses that a porous carbon membrane platinum-support structure can be obtained by subjecting a porous polyimide membrane to a heat treatment, forming a hydroxyl group, a carboxyl group or a like functional group in the resulting porous carbon membrane structure, dipping the resulting structure in an aqueous tetraammineplatinum (II) chloride solution to adhere a platinum precursor, and then reducing the thus-obtained platinum precursor.

Patent Documents 2 to 4 disclose a method for producing a metal-containing carbon material, wherein a metal component is dispersed in a polymer, followed by a heat treatment. For example, Patent Document 3 discloses that a carbon onion structure layered around a metal particle is obtained by subjecting a nongraphitizing carbon precursor formed from a resin and a metal nitrate, etc., to a heat treatment. Furthermore, Patent Document 3 also discloses that by additionally supporting precious metal particles (platinum, etc.), the catalytic activity of platinum or the like can be enhanced by the synergistic effect.

The above mentioned platinum metals have a high catalytic activity, but because they are rare and expensive, a manganese oxide is actually used in zinc air cells, etc., as an inexpensive alternative. For example, Patent Document 5 discloses that a catalyst sheet for an oxygen-reduction electrode can be obtained by mixing $MnO_x$ having an average particle diameter of not more than 100 nm with activated carbon, carbon black or the like.

[Patent Document 1] Japanese Unexamined Patent Publication No. 2003-128409
[Patent Document 2] Japanese Unexamined Patent Publication No. 1990-109217
[Patent Document 3] Japanese Unexamined Patent Publication No. 2005-19332
[Patent Document 4] Japanese Unexamined Patent Publication No. 2003-53167
[Patent Document 5] Japanese Unexamined Patent Publication No. 2002-93425

DISCLOSURE OF THE INVENTION

Problem to be Solved by the Invention

When a manganese oxide ($MnO_x$) is used as a catalyst component, it is necessary to reduce the size of the manganese oxide and uniformly disperse it on the surface of the carrier in order to further increase catalytic activity.

An example of the use of a manganese oxide includes a method disclosed in Patent Document 5, wherein a catalytic material is produced by mixing manganese oxide fine particles with a carbon material. In this method, there is a limitation in reducing the size of the manganese oxide supported. Furthermore, since this is a method wherein the carrier and the supported metal are mixed, there is room for improvement in terms of achieving a uniform dispersion.

The present invention is achieved in view of the above problem. In other words, an object of the present invention is to provide a method for producing a manganese oxide dispersion material, which can reduce the size of manganese oxide particles to extremely small and uniformly disperse the particles on a carrier.

Means for Solving the Problem

The present inventors conducted extensive research and found that the above object can be achieved by providing a coating formed from a polyamide acid solution that contains a manganese nitrate dissolved therein on the surface of a substrate, and subjecting the coating to a heat treatment under specific conditions. The present invention has thus been accomplished.

The present invention relates to methods of producing manganese oxide nanoparticle dispersed materials and electrode as below:

1. A method for producing a manganese oxide nanoparticle dispersed material having steps of:
   dissolving manganese nitrate in a polyamide acid solution (Step 1);
   forming a coating on the surface of the substrate using the polyamide acid solution containing manganese nitrate dissolved therein (Step 2); and
   carbonizing the polyamide acid and depositing manganese oxide nanoparticles by subjecting the coating to a heat treatment at a temperature not less than 600° C. but not more than 1200° C. (Step 3).

2. A method for producing a manganese oxide nanoparticle dispersed material having steps of:
   dissolving manganese nitrate in a polyamide acid solution (Step 1);
   forming a coating on the surface of the substrate using the polyamide acid solution containing manganese nitrate dissolved therein, and then imidizing the polyamide acid contained in the coating so as to form the coating into a manganese-containing polyimide coating (Step 2); and subjecting the manganese-containing polyimide coating to a heat treatment at a temperature of not less than 600° C. but not more than 1200° C. to carbonize the polyimide and deposit manganese oxide nanoparticles (Step 3).

3. The production method according to Item 1, wherein the polyamide acid solution contains dimethylacetamide as the solvent.

4. A method for producing an electrode having manganese oxide nanoparticles dispersed thereon, the method comprising steps of:

dissolving manganese nitrate in a polyamide acid solution (Step 1);

forming a coating on the surface of a porous electrode substrate (carrier) using the polyamide acid solution containing manganese nitrate dissolved therein (Step 2); and carbonizing the polyamide acid and depositing manganese oxide nanoparticles by subjecting the coating to a heat treatment at a temperature not less than 600° C. but not more than 1200° C. (Step 3).

5. The production method according to Item 4, wherein the porous electrode substrate is at least one member selected from the group consisting of carbon papers, carbon non-woven fabrics and carbon felts.

Effect of the Invention

The production method of the present invention makes it possible to readily obtain a material having manganese oxide nanoparticles uniformly dispersed on carbon (a carrier). This method is advantageous in that nano-order manganese oxide fine particles can be dispersed on the carbon (carrier) more uniformly and easily than in known methods wherein the carbon (carrier) and manganese oxide particles are mixed. The thus-obtained material exhibits high catalytic activity attributable to uniform dispersion of nano-ordered manganese oxide fine particles.

EXPLANATION OF SYMBOLS

Figure 1:
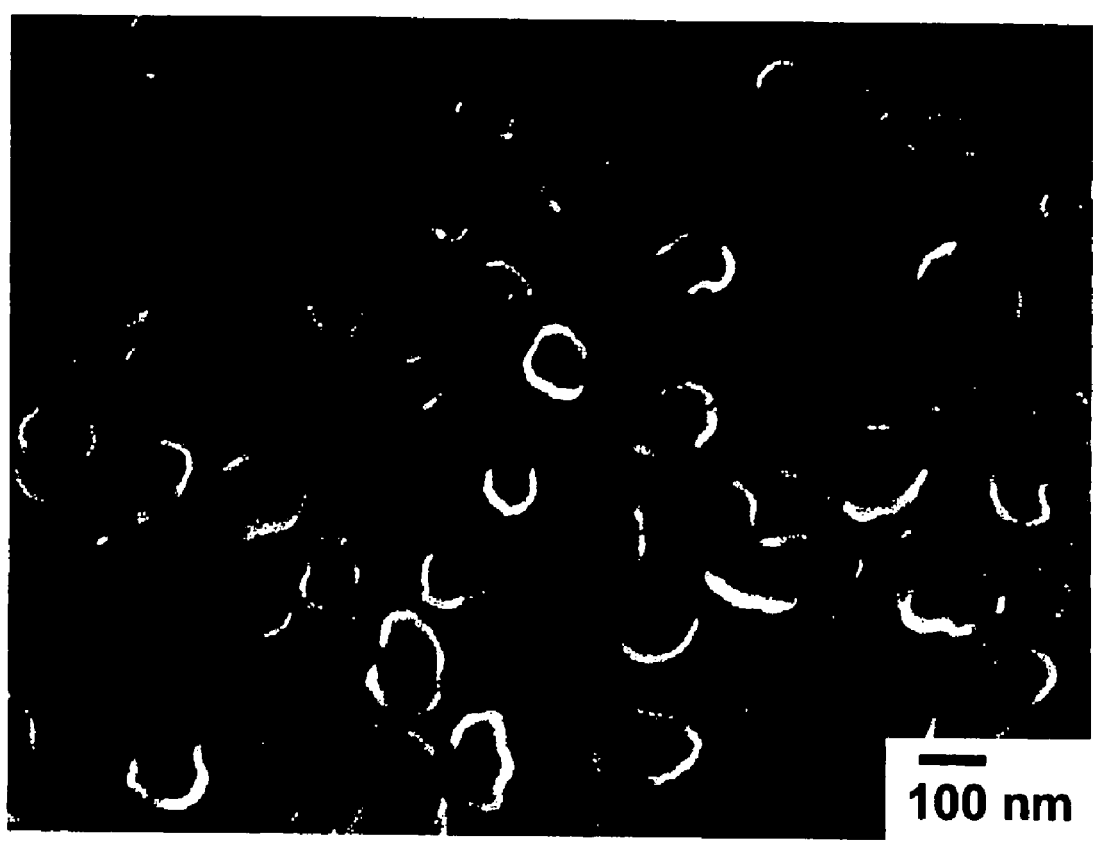
FIG. 1 shows an image of the carbonized coating obtained in Example 1 (a heat treatment conducted at 900° C.) taken using a scanning electronic microscope (SEM).

1 Air electrode
1a Test Electrode or Comparative Electrode
1b Porous fluoride resin sheet
1c Electrode reed
2 Counter electrode
3 Reference electrode
4 Electrolyte
5 Glass cell

BEST MODE FOR CARRYING OUT THE INVENTION

The method for producing a manganese oxide nanoparticle dispersed material of the present invention include steps of dissolving manganese nitrate in a polyamide acid solution (Step 1); forming a coating on the surface of the substrate using the polyamide acid solution containing manganese nitrate dissolved therein (Step 2); and carbonizing the polyamide acid and depositing manganese oxide nanoparticles by subjecting the coating to a heat treatment at a temperature not less than 600° C. but not more than 1200° C. (Step 3).

The method of the present invention having the above characteristics utilizes a property of manganese nitrate, specifically that it dissolves in a polyamide acid solution. In other words, by providing a coating on the surface of a substrate using a polyamide acid solution containing manganese nitrate dissolved therein, and then subjecting the resulting coating to a heat treatment at a specific temperature, a material having manganese oxide nanoparticles uniformly dispersed on carbon (a carrier) can be obtained. More specifically, polyamide acid is a carbon precursor, which is carbonized during the above-described heat treatment, and manganese components are deposited as manganese oxide during the carbonization process. By employing the method of the present invention, a material containing manganese oxide nanoparticles uniformly dispersed on carbon can be readily obtained.

Each step of the method of the present invention is explained below:

Step 1

In Step 1, manganese nitrate is dissolved in a polyamide acid solution.

The polyamide acid solution can be obtained, for example, by dissolving bis(4-aminophenyl)ether and pyromellitic dianhydride in dimethylacetamide. The usable materials are not limited to bis(4-aminophenyl)ether and pyromellitic dianhydride as long as a polyamide acid can be obtained.

There is no limitation to the solvent contained in the polyamide acid solution as long as it dissolves polyamide acid. Examples of usable solvents include dimethylacetamide, N-methyl-pyrrolidone, etc. These solvents can be used alone or in combination.

The manganese nitrate to be dissolved in the polyamide acid solution may be either manganese nitrate anhydride or manganese nitrate hydrate. An example of manganese nitrate hydrate is manganese nitrate hexahydrate (Mn$(NO_3)_2 \cdot 6H_2O$). These manganese nitrates may be used alone or in combination.

Because manganese nitrate inevitably contains at least one oxygen atom, even if the heat treatment of Step 3 is conducted under an atmosphere substantially free from oxygen (i.e., an inert atmosphere or a vacuum atmosphere), manganese oxide is obtained through the above-explained heat treatment.

The amount of manganese nitrate dissolved in the polyamide acid solution is not particularly limited and suitably selected depending on the type of manganese nitrate, and the application of the final product. When the final product is used as an oxygen-reduction catalyst, it is preferable that the dissolved amount of the manganese nitrate be selected so that the amount of manganese be 5 to 30 wt % per carbon (carrier) calculated as a metallic amount.

Step 2

In Step 2, a coating of a polyamide acid solution with manganese nitrate dissolved therein (hereunder, this solution is simply referred to as a "manganese-containing solution") is provided on the surface of a substrate.

There is no limitation to the material for the substrate and, for example, carbon, metal, silicon may be used. When the final product is used as an electrode for a battery or a sensor utilizing an oxidation-reduction reaction, it is preferable that a porous electrode substrate be used as the substrate. Preferable examples of materials for the porous electrode substrate include carbon papers, carbon nonwoven fabrics, carbon felts or like materials formed from carbon fiber but not limited to these.

Examples of the methods for forming a coating of the manganese-containing solution include spin coating, impregnation, dripping, etc. The method is suitably selected depending on the shape of the substrate, etc. There is no limitation to the thickness of the coating, but approximately 0.01 to 1 μm is preferable.

In order to improve stability with time, the coating of the manganese-containing solution may be converted into a manganese-containing polyimide coating by imidizing the polyamide acid contained therein by dehydration polymerization. The imidization can be conducted by, for example, subjecting the coating to a heat treatment at a temperature not exceeding 300° C. under an inert atmosphere or a vacuum atmosphere.

Step 3

In Step 3, the coating of manganese-containing solution or the manganese-containing polyimide coating obtained by subjecting the coating of manganese-containing solution to further imidization is treated at a temperature not less than 600° C. but not more than 1200° C. so as to carbonize the polyamide acid or polyimide contained in the coating and deposit manganese oxide nanoparticles.

The heat treatment is conducted so as to carbonize the carbon precursor (polyamide acid or polyimide) contained in the coating. The temperature of the heat treatment is not limited as long as it falls within the range from 600° C. to 1200° C., but preferably not less than 800° C. but not more than 1200° C., and more preferably not less than 800° C. but not more than 900° C. By setting the heating temperature in that range, oxygen-reduction efficiency of the manganese oxide nanoparticle dispersed material can be readily enhanced.

By setting the heating temperature to not less than 600° C., carbonization of the carbon precursor can probably be promoted and the resulting manganese oxide nanoparticle dispersed material has excellent conductivity. By setting the heating temperature to not more than 1200° C., probably because a linking group between carbon and nitrogen can be retained in the carbon component, the resulting material achieves excellent oxygen-reduction activity.

If the heat treatment temperature is below 600° C., manganese oxide may not be deposited. However, if the heat treatment temperature exceeds 1200° C., oxygen-reduction efficiency may be reduced. Therefore, the heat treatment temperature falls within the range from 600° C. to 1200° C. in the present invention.

The heat treatment time can be suitably selected depending on the heat treatment temperature and the properties of the coating to be treated. In order to reduce the size of the manganese oxide nanoparticles, rapid heating is preferable. Rapid heating can be conducted using, for example, an infrared image furnace.

In order to prevent complete combustion of the carbon precursor due to the heat treatment, it is preferable that the heat treatment be conducted under an atmosphere substantially free from oxygen (an inert atmosphere or a vacuum atmosphere). An example of an inert atmosphere is an atmosphere containing exclusively at least one of argon, helium or nitrogen.

By the above procedure, a material having manganese oxide nanoparticles uniformly dispersed therein can be obtained. The particle diameter of the manganese oxide nanoparticles deposited by the above-explained method is preferably approximately 10 to 300 nm, and more preferably approximately 100 to 200 nm.

EXAMPLES

The present invention is explained in detail below with reference to Examples and Comparative Examples.

Example 1

Manganese Nitrate, Heat Treatment at 900° C.

Bis(4-aminophenyl)ether (5.00 g) was placed in a round bottom flask under a nitrogen gas atmosphere. Subsequently, 120 ml of dimethylacetamide was added, followed by stirring and dissolution.

Pyromellitic dianhydride (5.45 g) was added thereto, and then stirred for about 3 hours. As a result, the viscosity gradually increased, giving a 10% polyamide acid solution.

To 5 g of the polyamide acid solution was added 0.3963 g of manganese nitrate hexahydrate ($Mn(NO_3)_2 \cdot 6H_2O$), and dissolved by stirring for 1 hour. By mixing polyamide acid solution with manganese nitrate hexahydrate ($Mn(NO_3)_2 \cdot 6H_2O$) in the above specified amounts, when the polyamide acid (via polyimide) is carbonized, 25 wt % of manganese relative to carbon, as calculated as a metallic amount, can be obtained.

The polyamide acid solution containing the manganese nitrate hexahydrate dissolved therein was applied to the top of a low resistivity n-type silicon substrate by spin coating so as to form a coating.

The resulting coating was subjected to a heat treatment in a vacuum dryer, which was evacuated using a rotary pump, at 120° C. for approximately 1 hour, followed by an additional heat treatment in the same vacuum dryer at 200° C. for approximately 3 hours. By conducting such treatments, the polyamide acid was imidized due to dehydration polymerization and the coating was transformed into a manganese-containing polyimide coating (hereunder, it is referred to as a "polyimide coating").

Subsequently, the resulting polyimide coating was subjected to a heat treatment in an electric furnace under an argon gas atmosphere at 900° C. so as to carbonize the polyimide. Specifically, the temperature was increased from room temperature to 900° C. at a rate of 5° C./min and then kept at 900° C. for 1 hour.

By conducting the heat treatment at 900° C., the polyimide was pyrolyzed and nitrogen, oxygen and hydrogen no longer existed therein, giving a carbonized coating. The resulting carbonized coating was approximately 50% lighter than the polyimide coating.

After the heat treatment, the carbonized coating was cooled to room temperature.

The carbonized coating had conductivity and was satisfactorily carbonized. The surface of the carbonized coating was observed using a scanning electronic microscope (SEM) and it was confirmed that, as shown in FIG. 1, fine particles having a diameter of several hundred nm were uniformly dispersed. The fine particles were identified using characteristic x-ray spectrum analysis (EDX) and electron diffraction measurement and it was confirmed that they were crystalline manganese oxide.

Example 2

Manganese Nitrate, Heat Treatment at 700° C.

A polyimide coating was subjected to a heat treatment in an infrared image furnace under an argon gas atmosphere at 700° C. to carbonize the polyimide. Rapid heating control was achieved through use of an infrared image furnace. Specifically, the temperature was increased from room temperature to 700° C. at a rate of 10° C./sec and then kept at 700° C. for 30 minutes. The other conditions were the same as those in Example 1.

Figure 3:
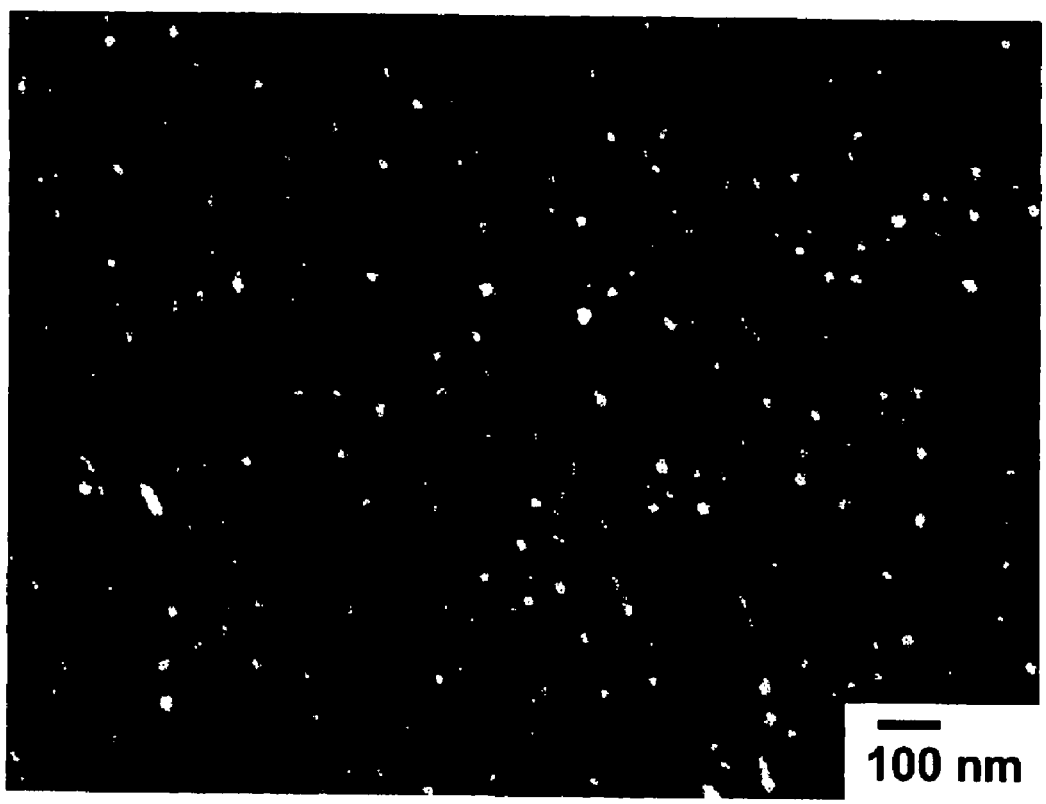
FIG. 3 shows an image of the carbonized coating obtained in Example 2 (a heat treatment conducted at 700° C.) taken using a scanning electronic microscope (SEM).

The surface of the carbonized coating was observed using an SEM and it was confirmed that, as shown in FIG. 3, fine particles having a diameter of 10 nm to several tens of nanometers were uniformly dispersed. The fine particles were identified using EDX and electron diffraction measurement and it was confirmed that they were crystalline manganese oxide.

Comparative Example 1

Manganese Oxide

Manganese oxide was added to 5 g of 10% polyamide acid solution prepared in Example 1 and stirred for approximately 24 hours. The other conditions were the same as those in Example 1.

The manganese oxide was substantially insoluble in the polyamide acid solution and precipitated.

Comparative Example 2

Manganese Acetate

Manganese acetate (0.292 g) was added to 4 g of 10% polyamide acid solution prepared in Example 1 and stirred for approximately 24 hours. The other conditions were the same as those in Example 1.

The manganese acetate was substantially insoluble in the polyamide acid solution, and gradually colored to dark brown and a part thereof was gelated.

Comparative Example 3

Manganese Sulfate

Manganese sulfate (II) pentahydrate (0.1476 g) was added to 2.2 g of 10% polyamide acid solution prepared in Example 1 and stirred for 15 hours. The other conditions were the same as those in Example 1.

The manganese sulfate (II) pentahydrate was substantially insoluble in the polyamide acid solution and precipitated.

Comparative Example 4

Manganese Nitrate, Heat Treatment at 500° C.

A polyimide coating was subjected to a heat treatment in an electric furnace under an argon gas atmosphere at 500° C. so as to carbonize the polyimide. Specifically, the temperature was increased from room temperature to 500° C. at a rate of 5° C./min and then kept at 500° C. for 1 hour.

Figure 2:
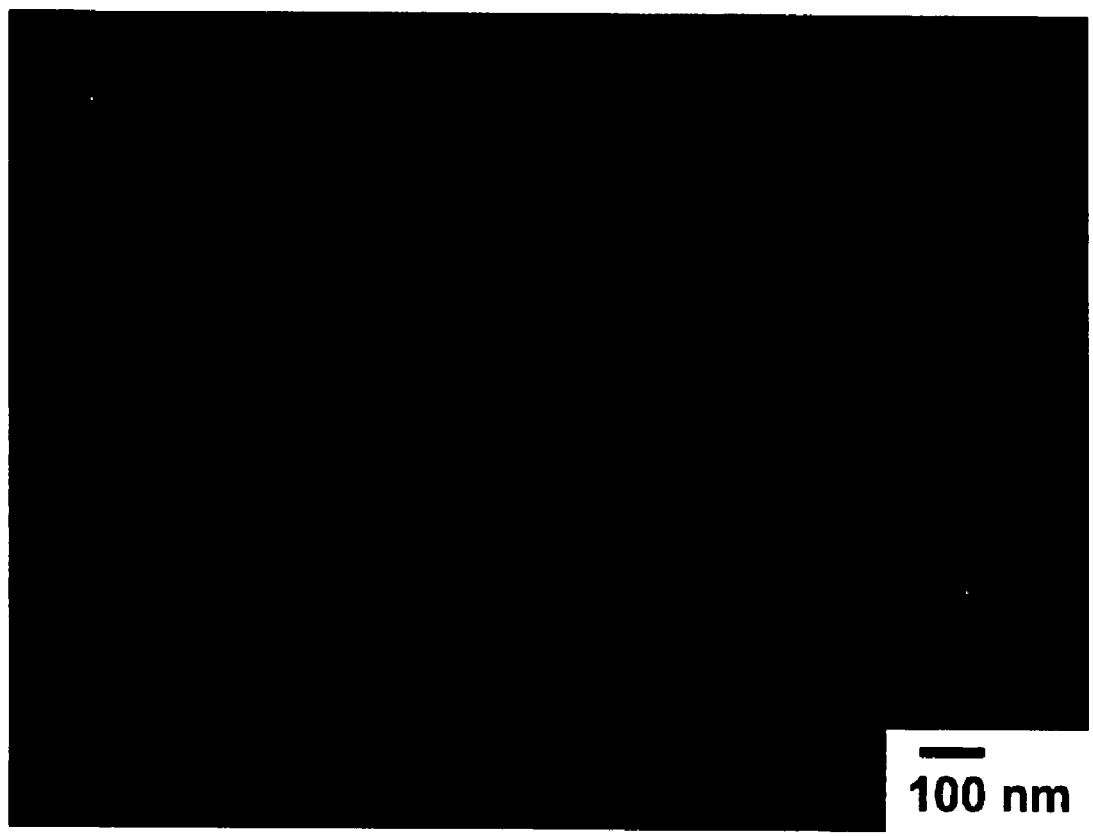
FIG. 2 shows an image of the carbonized coating obtained in Comparative Example 4 (a heat treatment conducted at 500° C.) taken using a scanning electronic microscope (SEM).

The surface of the carbonized coating was observed using an SEM and it was confirmed that, as shown in FIG. 2, the surface was very smooth and no deposition of manganese oxide was observed.

Results

As is clear from Comparative Examples 1 to 3, manganese oxide, manganese acetate, and manganese sulfate do not substantially dissolve in a polyamide acid solution. In contrast, as is clear from Examples 1 and 2, manganese nitrate dissolves in a polyamide acid solution. Even if a manganese nitrate is used, when the carbonizing temperature is unduly low (Comparative Example 4), manganese oxide nanoparticles do not deposit. However, when the carbonizing temperature is sufficiently high (Examples 1 and 2), manganese oxide nanoparticles deposit.

Example 3

Production of Test Electrode 1

Manganese nitrate hexahydrate ($Mn(NO_3)_2 \cdot 6H_2O$, 2.4 g) was added to 30 g of 10% polyamide acid solution prepared in Example 1 and stirred for 1 hour to dissolve it. By mixing polyamide acid solution with manganese nitrate hexahydrate ($Mn(NO_3)_2 \cdot 6H_2O$) in the above specified amounts, when the polyamide acid (via polyimide) is carbonized, 25 wt % of manganese relative to carbon, as calculated as a metallic amount, can be obtained. The above procedure gives a polyamide acid solution containing manganese nitrate hexahydrate dissolved therein and having a solid components concentration of 14 wt %.

The resulting solution having a solid components concentration of 14 wt % was diluted with dimethylacetamide so as to make the solid components concentration 7 wt %. Hereunder, this 7 wt % solution is referred to as "Solution 1".

A square carbon paper (approximately 30 mm×30 mm, product name of TGP-H-120, product of Toray Industries, Inc., thickness of 0.37 mm, porosity of 78%) was prepared as a porous electrode substrate.

The porous electrode substrate was placed on a filter paper and the Solution 1 was uniformly added dropwise so that the Solution 1 percolated to the filter paper placed thereunder. After completion of dropping, any excess of solution was roughly absorbed with a filter paper, and then dried on a petri dish in a nitrogen stream over night. A manganese-containing polyamide acid coating was thereby formed on the surface of a substrate.

After drying, the resulting coating was subjected to a heat treatment in a vacuum dryer, which was evacuated using a rotary pump, at 120° C. for approximately 1 hour, followed by an additional heat treatment in the same vacuum dryer at 200° C. for approximately 3 hours. By conducting such treatments, the polyamide acid was imidized due to dehydration polymerization and the coating was transformed into a manganese-containing polyimide coating (hereunder, it is referred to as a "polyimide coating").

Subsequently, the resulting polyimide coating was subjected to a heat treatment in an electric furnace under an argon gas atmosphere at 800° C. so as to carbonize the polyimide. Specifically, the temperature was increased from room temperature to 800° C. at a rate of 5° C./min and then kept at 800° C. for 1 hour.

Using the above procedure, a manganese oxide nanoparticle dispersed electrode (Test Electrodes 1) was obtained.

The particle diameter of the manganese oxide nanoparticles was approximately 100 nm.

Example 4

Production of Test Electrodes 2

A polyimide coating was subjected to a heat treatment in an infrared image furnace under an argon gas atmosphere at 600° C. to carbonize the polyimide. Specifically, the temperature was increased from room temperature to 600° C. at a rate of 10° C./sec and then kept at 600° C. for 30 minutes. The other conditions were the same as those in Example 3.

Using the above procedure, a manganese oxide nanoparticle dispersed electrode (Test Electrodes 2) was obtained.

The particle diameter of the manganese oxide nanoparticles was approximately 10 nm.

Example 5

Production of Test Electrodes 3

A polyimide coating was subjected to a heat treatment in an electric furnace under an argon gas atmosphere at 900° C. to carbonize the polyimide. Specifically, the temperature was increased from room temperature to 900° C. at a rate of 5° C./min and then kept at 900° C. for 1 hour. The other conditions were the same as those in Example 3.

Using the above procedure, a manganese oxide nanoparticle dispersed electrode (Test Electrodes 3) was obtained.

The particle diameter of the manganese oxide nanoparticles was approximately 200 nm.

Example 6

Production of Test Electrodes 4

A polyimide coating was subjected to a heat treatment in an electric furnace under an argon gas atmosphere at 1200° C. to carbonize the polyimide. Specifically, the temperature was increased from room temperature to 1200° C. at a rate of 5° C./min and then kept at 1200° C. for 1 hour. The other conditions were the same as those in Example 3.

Using the above procedure, a manganese oxide nanoparticle dispersed electrode (Test Electrodes 4) was obtained.

The particle diameter of the manganese oxide nanoparticles was approximately 300 nm.

Comparative Example 5

Production of Comparative Electrode 1

The carbon paper of Example 3 was used as Comparative Electrode 1 without modification.

Comparative Example 6

Production of Comparative Electrode 2

Manganese oxide powder (product of Kojundo Chemical Lab. Co., Ltd., 0.084 g, particle diameter of approximately 100 nm) and 0.183 g of carbon black were mixed in amounts so that 25 wt % of manganese relative to carbon, as calculated as a metallic amount, can be obtained.

An ethanol solution (10 ml) containing 0.05 wt % of proton-conductive Nafion (Nafion 112, product of Du Pont) dissolved therein was prepared.

The above-explained mixture was dissolved in the resulting Nafion ethanol solution, giving a material for an electrode.

The electrode material was uniformly applied dropwise to a square carbon paper having a size of approximately 30 mm×30 mm, and then the ethanol was removed by drying with hot air.

Using the above procedure, a manganese oxide nanoparticle dispersed electrode (Comparative Electrodes 2) was obtained.

Comparative Example 7

Production of Comparative Electrode 3

A polyimide coating was subjected to a heat treatment in an electric furnace under an argon gas atmosphere at 1500° C. to carbonize the polyimide. Specifically, the temperature was increased from room temperature to 1500° C. at a rate of 5° C./min and then kept at 1500° C. for 1 hour. The other conditions were the same as those in Example 3.

Using the above procedure, a manganese oxide nanoparticle dispersed electrode (Comparative Electrodes 3) was obtained.

The particle diameter of the manganese oxide nanoparticles was approximately 400 nm.

Test Example 1

Comparison of Properties of Electrodes

Oxygen-reduction properties of the Test Electrodes 1 to 4 and comparative electrodes 1 to 3 were evaluated.

Figure 4:
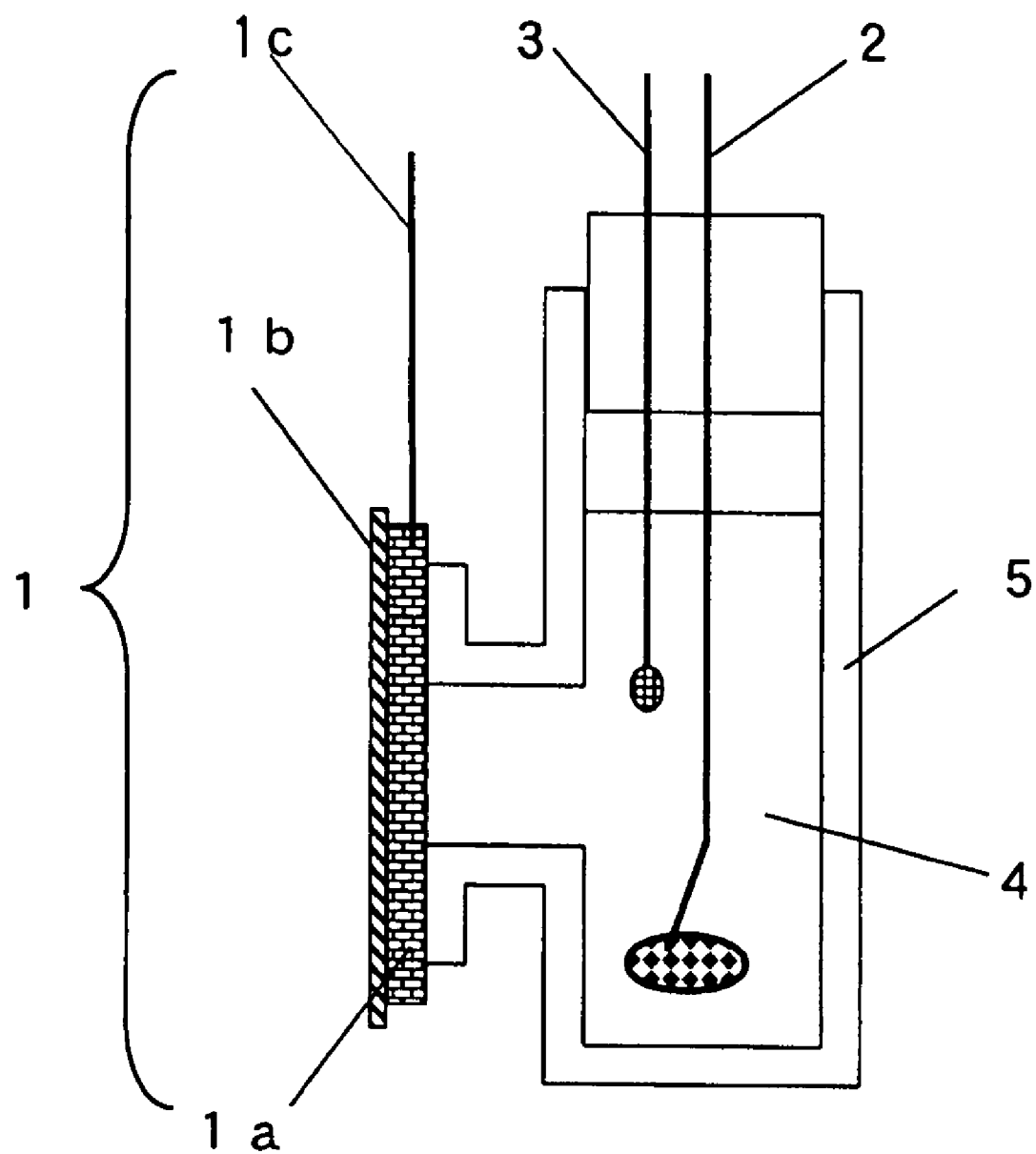
FIG. 4 shows a cross-sectional view of a three-electrode cell used in Test Example 1.

Specifically, oxygen-reduction properties of each electrode were evaluated by a cyclic voltammetry method using a three electrode cell shown in FIG. 4 based on the current-voltage characteristics. In FIG. 4, 1 indicates an air electrode, 1a indicates a test electrode or comparative electrode, 1b indicates a porous fluoride resin sheet, 1c indicates an electrode reed, 2 indicates a counter electrode, 3 indicates a reference electrode, 4 indicates an electrolyte, and 5 indicates a glass cell having a circular opening 8 mm in diameter for disposing an air electrode therein.

The air electrode 1 was disposed in the opening of the glass cell 5 as shown in FIG. 4. The porous fluoride resin sheet 1b side surface was exposed to air, and the other surface was in contact with the electrolyte 4. In other words, the Test Electrode or Comparative Electrode 1a was disposed so as to be in contact with the electrolyte 4. The Test Electrode or Comparative Electrode 1a and the porous fluoride resin sheet 1b were adhered to each other.

A 0.1 M aqueous potassium hydroxide (KOH) solution of pH13 was used as the electrolyte 4.

Platinum was used as the counter electrode 2 and an Ag/AgCl (saturated KCl) electrode was used as the reference electrode 3.

Figure 5:
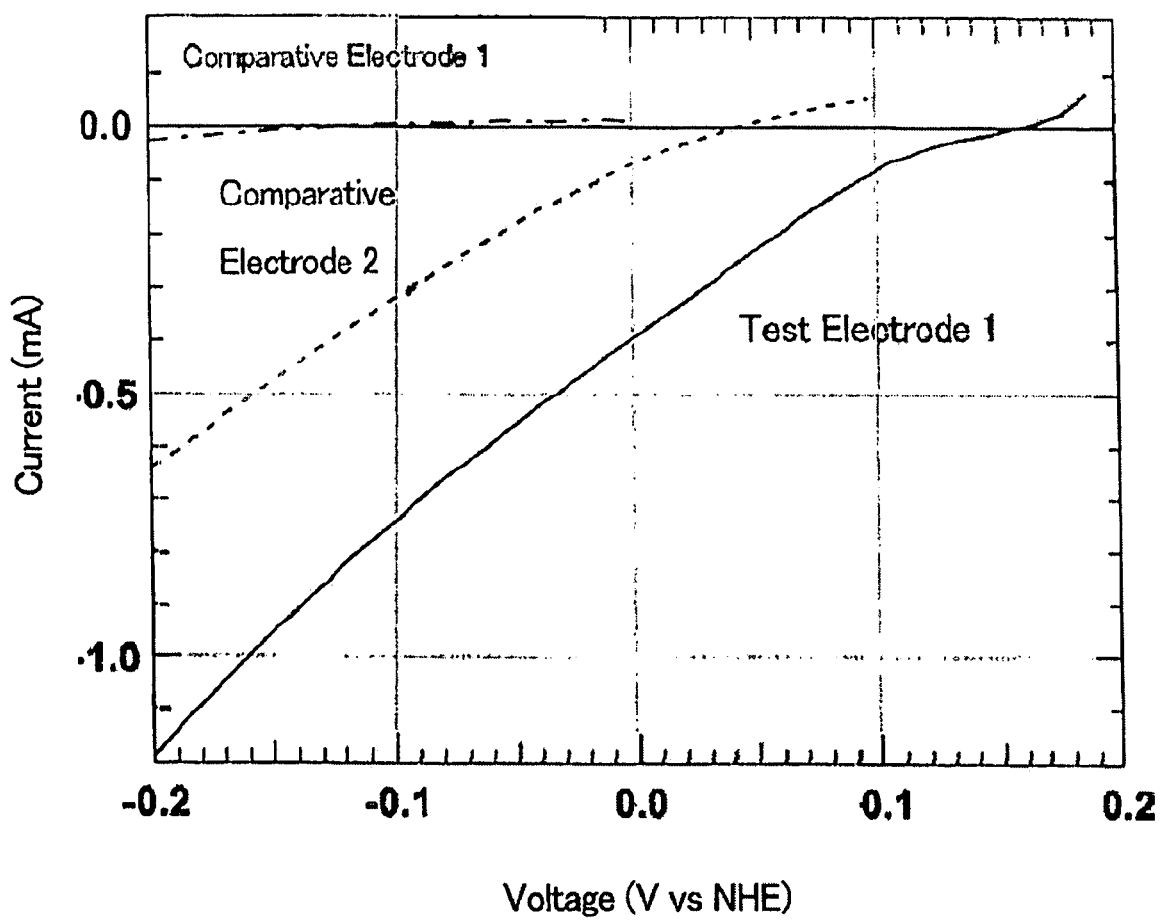
FIG. 5 shows oxygen-reduction properties (electric current-electric potential properties) of Test Electrode 1, and Comparative Electrodes 1 and 2.

FIG. 5 shows the current-voltage characteristics when the Test Electrodes 1, and Comparative Electrodes 1, 2 were used as the air electrode 1. The electrical potential shown on the horizontal axis of FIG. 5, which is expressed using the scale of a standard hydrogen electrode (NHE), indicates the current measured after applying a voltage for 10 seconds.

When the voltage was swept from positive to negative, the Test Electrode 1 indicated the oxygen-reduction initiation voltage (V vs NHE), at which the current changes from positive to negative, of +0.14 V, the current at the voltage of 0.0 V was 0.40 mA, and the current at the voltage of −0.2 V was 1.2 mA.

Comparative Electrode 1, in which a carbon paper was used without modification, indicated the oxygen-reduction initiation voltage of −0.12 V, oxygen-reduction current was not observed at 0.0 V and the current at −0.2 V was 0.03 mA.

Comparative Electrode 2, in which a manganese oxide powder was dispersed, indicated the oxygen-reduction initiation voltage of +0.05V, the current at 0.0 V was 0.10 mA and the current at −0.2 V was 0.65 mA.

The same evaluation was conducted using Test Electrodes 2 to 4 and Comparative Electrode 3.

Table 1 shows the heat treatment temperature, oxygen-reduction initiation voltage, current at 0.0 V, and current at −0.2 V of each electrode.

TABLE 1

| | Heat Treatment Temperature (° C.) | Oxygen-reduction initiation voltage (V vs NHE) | Current at 0.0 V (mA) | Current at −0.2 V (mA) | Remarks |
| --- | --- | --- | --- | --- | --- |
| Test Electrode 1 | 800 | +0.14 | 0.40 | 1.2 | |
| Test Electrode 2 | 600 | +0.10 | 0.04 | 0.35 | |
| Test Electrode 3 | 900 | +0.15 | 0.41 | 1.3 | |
| Test Electrode 4 | 1200 | +0.07 | 0.06 | 1.3 | |
| Comparative Electrode 1 | — | −0.12 | — | 0.03 | Carbon Paper |
| Comparative Electrode 2 | — | +0.05 | 0.10 | 0.65 | Manganese Oxide Powder Dispersion |
| Comparative Electrode 3 | 1500 | +0.05 | 0.02 | 0.65 | |

Results

Test Electrodes 1 to 4 have higher oxygen-reduction initiation voltages than those of Comparative Electrodes 1 to 3.

In other words, Test Electrodes 1 to 4 have higher oxygen-reduction efficiency than Comparative Electrodes 1 to 3. Therefore, it can be concluded that a temperature of 1500° C. is inappropriate for the heat treatment temperature (too high) and the heat treatment temperature is preferably in the range from 600° C. to 1200° C.

In the above range, a temperature from 800° C. to 1200° C. is particularly preferable, since a high oxygen-reduction current is allowed to flow at electrical potentials of 0.0 V and −0.2 V.

Test Electrodes 1 and 3 have remarkably higher oxygen-reduction initiation voltages than those of Comparative Electrodes 1 to 3, and a large oxygen-reduction current flowed at electrical potentials of 0.0 V and −0.2 V. These results indicate that the heat treatment temperature is particularly preferable within the range from 800° C. to 900° C.

The invention claimed is:

1. A method for producing a manganese oxide nanoparticle dispersed material having steps of:
    dissolving manganese nitrate in a polyamide acid solution;
    forming a coating on the surface of the substrate using the polyamide acid solution containing manganese nitrate dissolved therein, and then imidizing the polyamide acid contained in the coating so as to form the coating into a manganese-containing polyimide coating; and
    subjecting the manganese-containing polyimide coating to a heat treatment at a temperature of not less than 600° C. but not more than 1200° C. to carbonize the polyimide and deposit manganese oxide nanoparticles.

2. The production method according to claim 1, wherein the polyamide acid solution contains dimethylacetamide as a solvent.

3. A method for producing an electrode having manganese oxide nanoparticles dispersed thereon,
    the method comprising steps of:
    dissolving manganese nitrate in a polyamide acid solution;
    forming a coating on the surface of a porous electrode substrate using the polyamide acid solution containing manganese nitrate dissolved therein, and then imidizing the polyamide acid contained in the coating so as to form the coating into a manganese-coating polyimide coating; and
    subjecting the manganese-coating polyimide coating to a heat treatment at a temperature not less than 600° C. but not more than 1200° C. to carbonize the polyimide and deposit manganese oxide nanoparticles.

4. The production method according to claim 3, wherein the porous electrode substrate is at least one member selected from the group consisting of carbon papers, carbon nonwoven fabrics and carbon felts.

5. The production method according to claim 3, wherein the polyamide acid solution contains dimethylacetamide as a solvent.

* * * * *